Dec. 15, 1942. J. G. JOACHIM 2,305,427
WING SCREW
Filed Oct. 20, 1941

INVENTOR.
Joseph George Joachim
BY
Attorneys

Patented Dec. 15, 1942

2,305,427

UNITED STATES PATENT OFFICE 2,305,427

WING SCREW

Joseph George Joachim, Detroit, Mich., assignor to Ferro Stamping and Manufacturing Company, Detroit, Mich., a corporation of Michigan Application October 20, 1941, Serial No. 415,813

5 Claims. (Cl. 85—9)

This invention relates to wing screws and to an improved method of manufacturing wing screws.

In the past wing screws of the general type to which this invention pertains have been manufactured from forgings or malleable castings. The principal objection to this procedure is that it is expensive and requires considerable time in manufacture.

It is one of the principal objects of this invention to reduce the cost of as well as the time required to manufacture wing screws by providing a construction composed of two relatively inexpensive parts capable of being readily secured together to form a unit which is at least as durable and satisfactory as forged or malleable cast one piece constructions.

Another object of this invention is to provide a wing screw having a stud with a polygonally shaped head and having an elongated wing section formed with a polygonally shaped recess for receiving the head. In accordance with this invention, the polygonally shaped recess is dimensioned to fit the head on the stud with the side walls of the recess abutting the adjacent side walls of the head in a manner to provide a driving connection therebetween.

Still another object of this invention is to provide a construction of the type set forth above wherein the wing section is in the form of an elongated stamping channel shaped in cross section and having the central portion enlarged to form the stud head receiving recess previously referred to.

A further object of this invention is to secure the two parts of the wing screw together by welding the head of the stud to the stamping. In accordance with this invention the head of the stud is formed with projections engageable with the inner surface of the central polygonally shaped portion of the stamping and an abutment in the form of a flange extends radially outwardly from the base of the head. After the head is inserted into the polygonally shaped recess in the wing section, the latter is clamped against the projections by a pair of electrodes respectively engageable with the abutment or flange on the head and with the central portion of the wing section. A welding current is passed through the projections and wing sections while the latter are clamped together and the two parts are welded together to form an integral unit.

The foregoing, as well as other objects, will be made more apparent as this description proceeds, especially when considered in connection with the accompanying drawing, wherein.

Figure 1:
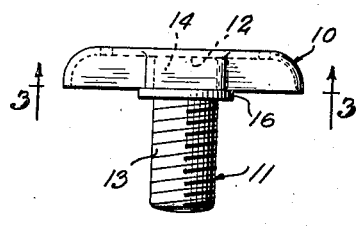
Figure 1 is a side elevational view of a wing screw constructed in accordance with this invention.
Figure 2:
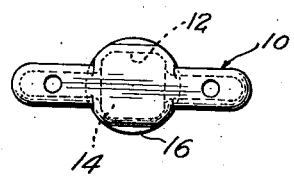
Figure 2 is a top plan view of the wing screw.
Figure 3:
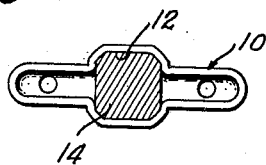
Figure 3 is a sectional view taken on the line 3—3 of Figure 1.

Referring more in detail to the drawing, it will be noted from Figure 1 that my improved wing screw comprises a wing section 10 and a stud 11. The wing section 10 is in the form of an elongated sheet metal stamping channel shaped in cross section and having a portion intermediate the ends thereof enlarged to provide a polygonally shaped recess 12. The stud 11 has a threaded shank 13 and a polygonally shaped head 14. The shape of the stud head 14 corresponds to the shape of the recess 12 and is dimensioned to enable the same to be readily inserted into the recess 12. The arrangement is such that when the stud head 14 is inserted in the recess 12, the opposite side walls of the recess have a flat engagement with the adjacent walls of the stud head 14 in the manner clearly shown in Figure 3. As a result, relative rotation of the wing section and stud is prevented.

In forming the stud, the head 14 is fashioned with projections 15 extending from the top surface of the head and is also formed with an abutment 16 at the underside of the head. In the present instance the abutment 16 is in the form of a flange which extends radially outwardly from the shank 13 of the stud immediately beneath the head 14.

In the interests of simplicity and economy in manufacture, the stud 11 is formed by what is commonly known in the trade as a cold heading process. However, the particular method employed in making the stud is not critical insofar as the present invention is concerned. In other words, a stud formed by any process is applicable to the present invention. I prefer, however, to form the stud by the cold heading process because this process is not only less costly but leaves burrs on the top of the stud head which serve the purpose of the projections 15.

Figure 4:
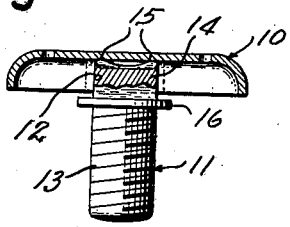
Figure 4 is a sectional view showing the parts prior to welding the same together.
Figure 5:
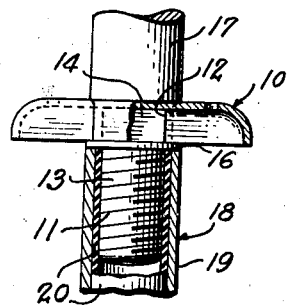
Figure 5 is a side elevational view partly in section of the wing screw and welding equipment.

In assembling the two parts of the wing screw, the head 14 on the stud is placed in the polygonally shaped recess 12 with the extremities of the projections 15 in abutting engagement with the bottom of the recess 12, as shown in Figure 4. When the parts are assembled in the manner previously pointed out, they are welded together to form an integral construction. In general, this is accomplished by what is commonly known in the trade as "projection welding." Upon reference to Figure 5, it will be noted that I have diagrammatically illustrated a pair of welding electrodes 17 and 18. The lower electrode 18 comprises a sleeve 19 and a tube of insulating material 20 which forms a lining for the sleeve 19. The external diameter of the lining 20 is such as to enable the shank 13 of the stud to be inserted into the same in such a manner that the upper end of the sleeve 19 engages the abutment 16 on the stud. The construction is such that the shank 13 of the stud 11 is insulated from the electrode 18 and the point of electrical contact is between the abutment 16 on the stud and the upper end of the sleeve 19. As a result, the path of travel of the welding current from one electrode to the other is reduced to the minimum and this is desirable because it enables obtaining an effective weld with the minimum amount of electrical power.

The top electrode 17 is engageable with the central portion of the wing section 10 and co-operates with the bottom electrode 18 to clamp the wing section against the projections 15 on the head 14 of the stud 11. During this clamping action a welding current is caused to flow from one electrode to the other through the wing section 10 and stud head 14. This current is of sufficient amperage to fuse the projections 15 and cause a molecular bond between the wing section and head 14 of the stud.

It follows from the foregoing that the said metal wing section and the stud form an integral unit which may be readily and inexpensively manufactured. It will also be noted that the resulting construction is of a durable nature because all of the turning torque or stress is transmitted from one part to the other through the polygonally shaped portions without stressing the weld.

What I claim as my invention is:

1. A wing screw comprising a wing section in the form of an elongated inverted channel shaped stamping having an enlarged imperforate polygonally shaped portion intermediate the ends, and a stud having a polygonally shaped head extending into the enlarged polygonally shaped central portion with the sides of the head engaging the adjacent sides of the enlarged portion of the stamping and having the top surface welded to the adjacent surface of the stamping.

2. A wing screw comprising an elongated inverted channel shaped part having a portion of the top surface intermediate the ends substantially flat for engagement with a welding electrode, a stud having a head located in the channel intermediate the ends of the latter and having substantially flat top and opposite side walls respectively engaging adjacent portions of the channel, the top wall of the stud head being welded to the adjacent wall of the channel to provide an integral construction, and an abutment on the stud at the bottom of the head engageable with a cooperating welding electrode whereby the path of welding current from one electrode to the other is restricted to the length of the stud head.

3. A wing screw comprising a wing section in the form of an inverted channel shaped sheet metal stamping having a portion intermediate the ends enlarged to provide a polygonally shaped recess and having a substantially flat top surface opposite the recess for engagement with a welding electrode, a stud having a head corresponding in shape to the recess and located in the recess with the top and sides thereof contacting adjacent sides of the recess to provide a driving connection between the wing section and stud, the top wall of the stud head being welded to the adjacent wall of the channel section to provide an integral construction, and an annular flange projecting radially outwardly from the stud at the bottom of said head and engageable with a cooperating welding electrode whereby the path of the welding current from one electrode to the other is restricted to the length of the stud head.

4. A wing screw comprising an elongated substantially channel shaped part having an enlarged polygonally shaped portion intermediate the ends provided with a flat imporforate base, and a stud having a head corresponding in cross sectional contour to the shape of the enlarged intermediate portion aforesaid and fitted in the latter portion with the top wall thereof welded to the base of the enlarged intermediate portion and with the sides abutting the adjacent sides of said enlarged intermediate portion to provide a driving connection between the stud and said channel shaped part.

5. A wing screw comprising a wing section and a stud permanently secured together, said wing section being in the form of an elongated inverted channel shaped part having an enlarged polygonally shaped portion intermediate the ends provided with an imperforate base, and a head on the stud corresponding in cross sectional contour to the shape of the enlarged intermediate portion on the wing section and fitted into the enlarged intermediate portion with the top wall thereof seated against the base of said portion and with the side walls abutting the adjacent sides of the enlarged portion to provide a driving connection between the stud and the wing section.

JOSEPH GEORGE JOACHIM.